United States Patent
Schmidt (12)

(10) Patent No.: US 6,749,388 B1
(45) Date of Patent: Jun. 15, 2004

(54) CONTAINER HANDLING APPARATUS

(76) Inventor: Hans Heinrich Schmidt, 1 Linton Avenue, Lower Templestowne, VIC 3107 (AU)

( * ) Notice: Subject to any disclaimer, the term of this patent is extended or adjusted under 35 U.S.C. 154(b) by 0 days.

(21) Appl. No.: 10/030,503

(22) PCT Filed: Jul. 6, 2000

(86) PCT No.: PCT/AU00/00819

§ 371 (c)(1),
(2), (4) Date: May 8, 2002

(87) PCT Pub. No.: WO01/03971

PCT Pub. Date: Jan. 18, 2001

(30) Foreign Application Priority Data

Jul. 8, 1999 (AU) .......................................... PQ 1472

(51) Int. Cl.⁷ .................................................. B60P 1/64
(52) U.S. Cl. ...................... 414/459; 414/460; 414/498
(58) Field of Search ................................. 414/498, 460, 414/549, 459

(56) References Cited

U.S. PATENT DOCUMENTS

| 2,304,622 | A | * | 12/1942 | Barrett | |
|---|---|---|---|---|---|
| 3,460,697 | A | * | 8/1969 | Cowlishaw et al. | |
| 3,541,598 | A | * | 11/1970 | Dousset | |
| 3,688,931 | A | * | 9/1972 | Tax et al. | 214/394 |
| 4,313,708 | A | * | 2/1982 | Tiliakos | 414/498 |
| 4,850,786 | A | * | 7/1989 | Oswald et al. | 414/460 |
| 5,006,031 | A | * | 4/1991 | Fossing et al. | 414/458 |
| 5,417,540 | A | * | 5/1995 | Cox | 414/498 |

* cited by examiner

Primary Examiner—Thomas J. Brahan
(74) Attorney, Agent, or Firm—James Ray & Associates

(57) ABSTRACT

A container handling apparatus utilising a cradle (1) having a chassis (2) adapted specifically for attachment to the top of the shipping container (C) and having lifting legs (3) attached to each corner of the chassis and incorporating lifting rams. The legs are pivotably attached at pivot points to the respective corners whereby to be swung between positions extending alongside the chassis in a stored orientation and positions extending downwardly from the chassis in a ground engaging orientation. The pivotable attachments for said lifting legs are such that the positions of the legs can be extended and retracted laterally of the chassis, whilst in the lower ends of said legs carry wheels (8) for mobility whereby the cradle with the legs extending downwardly from the chassis in a ground engaging orientation with, or without, a container suspended beneath said chassis, can be moved from one position to another. The pivotable attachments of the lifting legs to said chassis are such that the lateral movement of said legs, and their pivotable movement, relative to said chassis is accomplished simultaneously, or independently. The corners of the chassis have means (16) for attachment thereof to the top corners of said container and the chassis has recesses (32) extending longitudinally thereof between the means for attaching the chassis, and on each side thereof, for accommodating the legs when in the stored orientation.

10 Claims, 13 Drawing Sheets

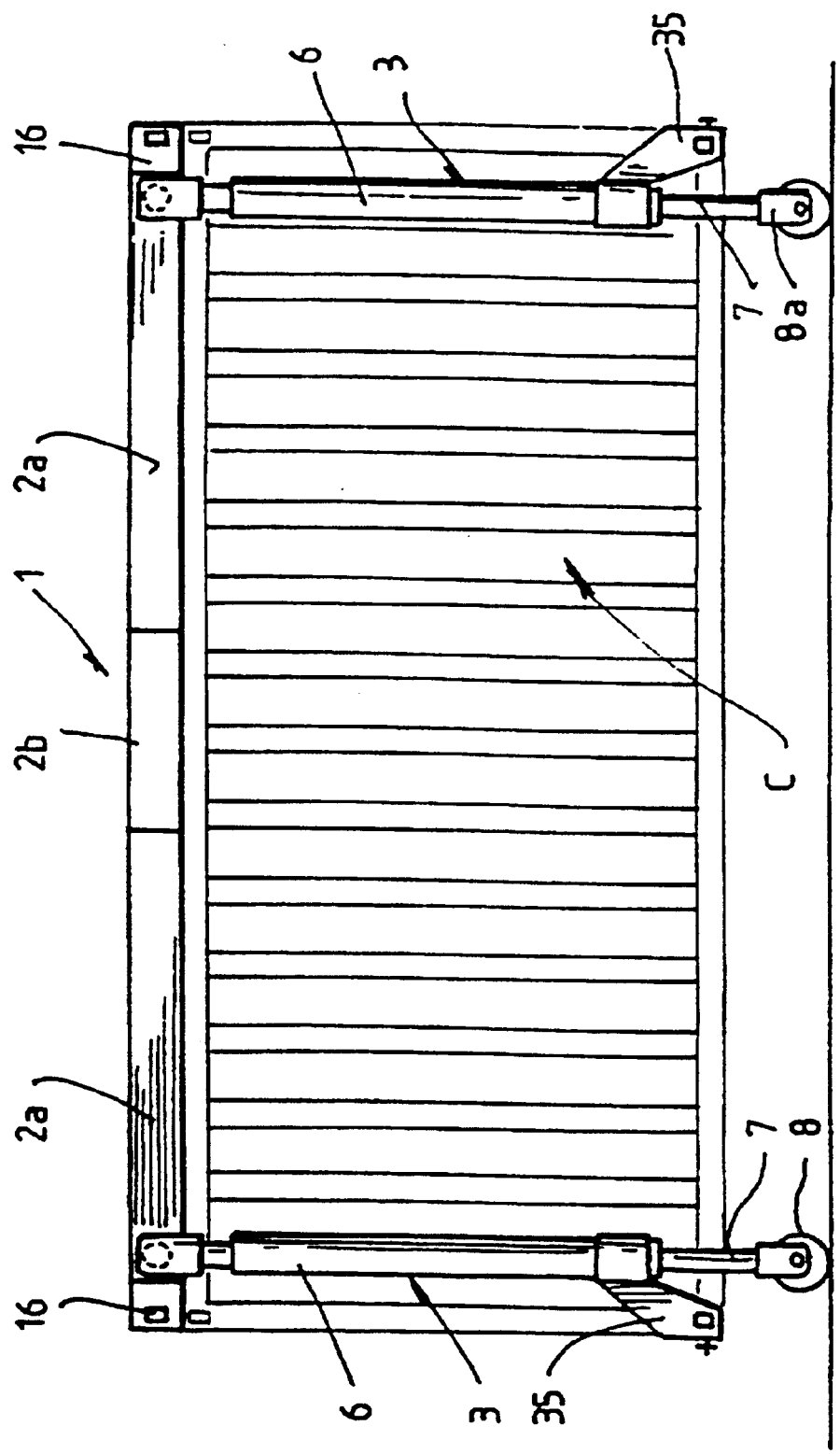

CONTAINER HANDLING APPARATUS

TECHNICAL FIELD

This invention relates to a container handling apparatus, and more particularly an apparatus incorporating a cradle adapted to be interconnected to a shipping container whereby the container can be shifted onto and off the trailer (tray) of a truck at a shipping port, rail terminal and/or factory.

BACKGROUND ART

Manipulation of containers is typically done by using forklift trucks, side-lifters, mobile cranes or accessories such as portable lifting devices in the form of jigs and jacks which can be located on-site or carried with a container.

Forklift trucks are very expensive equipment and are usually only available at well equipped sites, and are not necessarily available at many sites where containers need to be loaded onto and off the trays or trailers of road transports/ trucks. Side-lifters are also only available at well equipped sites and due to their manner of operation require space equivalent to three times the width of the container. Mobile cranes on the other hand are also very costly installations and normally only available at sites dedicated to the handling of large numbers of containers, such as at a shipping port.

As an alternative to forklift trucks, side-lifters and mobile cranes, portable lifting devices have been proposed, and such a lifting device is disclosed in International patent publication WO92/19527. However, the weight of a fully loaded container with such lifting devices leads to instability when supported on a number of separate jacks at each corner of the container, and thus such devices are not a totally satisfactory solution to the problem of lifting and manoeuvring containers, whilst in addition, the lifting devices require the services of a forklift truck to position the devices for attachment to a container.

Other lifting devices that are known utilise a rigid chassis having a plurality of lifting jacks, and examples of these are disclosed in U.S. Pat. Nos. 3,460,697, 4,053,073, 3,520,433, 4,522,550 and 3,152,709. However, none of the disclosures in these publications provide a container handling system adapted to move a container, in particular the movement of a container once it has been elevated for loading onto transport. The ability to move containers small distances is a particularly important problem which has not been addressed by any of the prior art devices or systems presently available to handle containers. Furthermore, none of the known devices and systems are able to be attached to the top of the container such that a single container handling system or cradle can be used on multiple containers. An overhead crane can be used to fit such devices and systems to a container thereby avoiding the need for forklifts or other types of mobile cranes.

Therefore, problems associated with loading and unloading containers onto and off the trays or trucks is only satisfactorily accomplished at very well equipped sites by the use of sophisticated and highly costly dedicated equipment. Moveover, the ability to manipulate, that is, manoeuvre, containers small distances is only available with the use of the same equipment used for loading and unloading the containers.

It has been proposed in International patent publication no. WO94/26630, to provide a container handling apparatus incorporating a cradle adapted for attachment to the top or bottom of a container, and having a chassis adapted to enagagably receive a container unit and two or more lifting legs adapted for independent or coordinated movement to effect the controlled movement of a container fitted to the cradle in any required vertical or horizontal direction, wherein the chassis has a substantially rigid frame dimensioned to allow stable engagement with a container and the lifting legs comprise laterally extending members attached to the frame and adapted for controllable movement in a lateral direction away from or toward the frame with members attached to the lateral extending member and adapted for controlling movement in the direction substantially vertical to the plane of movement of the lateral extending member such as to combine controlled movement of the lateral extending members and the lifting members of the lifting legs of the cradle provide for the control of manipulation of the cradle and can engage a container in any required vertical or horizontal lateral direction.

However, the container handling apparatus of the disclosure in publication no. WO94/26630 is a static apparatus insofar as, although it can raise and lower a container, the tray of the truck has to be positioned beneath the container when elevated by backing the trailer into position beneath the container when loading or by driving the truck tray away from beneath the container when unloading.

DISCLOSURE OF THE INVENTION

It is therefore an object of the present invention to provide a container handling apparatus utilising a cradle having a chassis adapted specifically for attachment to the top of a shipping container and having lifting legs attached to each corner of the chassis and incorporating lifting rams, wherein the legs are pivotably attached at pivot points to the respective corners whereby to be swung between positions extending alongside said chassis in a stored orientation and positions extending downwardly from said chassis in a ground engaging orientation, and wherein the pivotable attachments for said lifting legs are such that the position of the legs can be extended and retracted laterally of said chassis, and wherein the lower ends of said legs carry wheels for mobility whereby said cradle with said legs extending downwardly from said chassis in a ground engaging orientation with, or without, a container suspended beneath said chassis, can be moved from one position to another.

BRIEF DESCRIPTION OF THE DRAWINGS

Two preferred embodiments of the invention will now be described with reference to the accompanying drawings in which.

BEST MODES FOR CARRYING OUT THE INVENTION

Figure 1A:
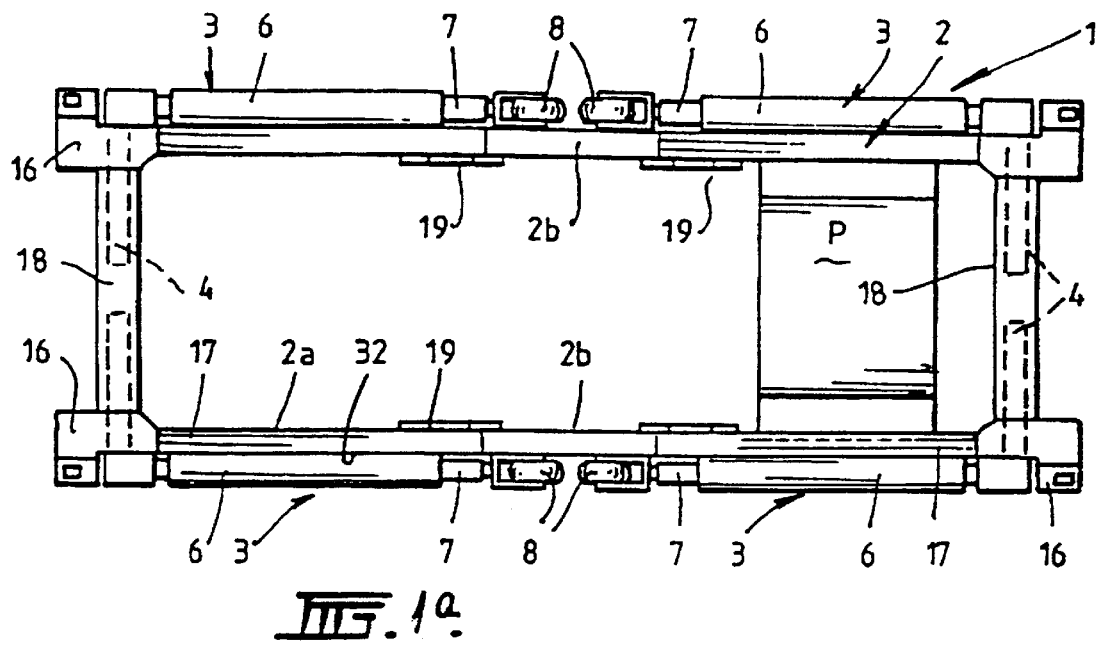
FIGS. 1a and 1b are plan and side elevational views of a container cradle having its legs in a stored and retracted position, FIG. 2. is a perspective view of the container cradle with its legs in an initial extended position prior to pivoting to a ground engaging orientation, FIG. 3. shows the container cradle attached to a container.
Figure 1B:
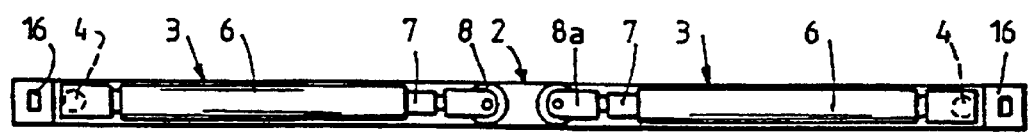
Figure 3:
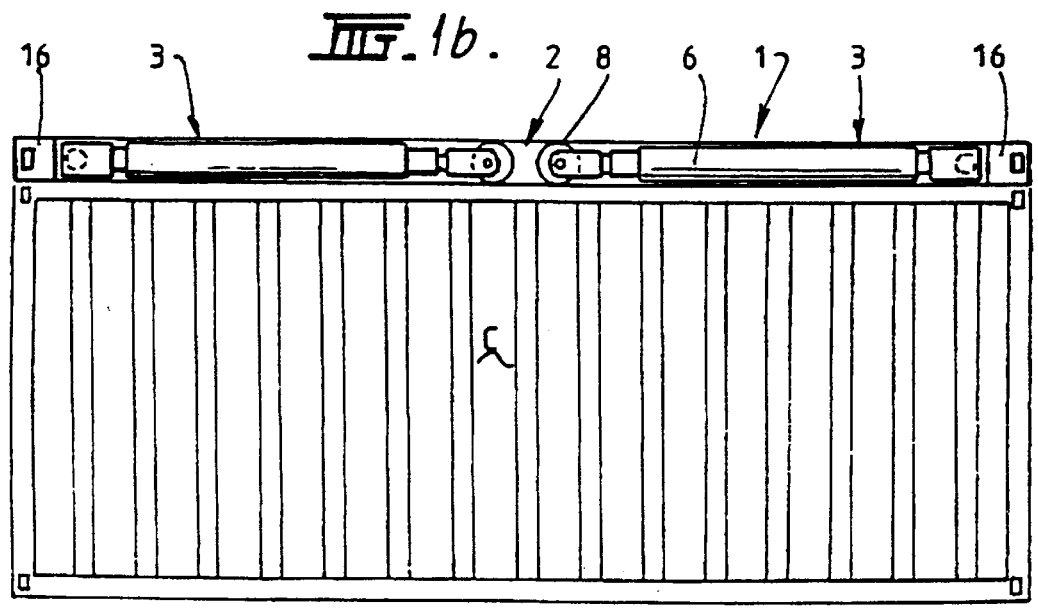
Figure 2:
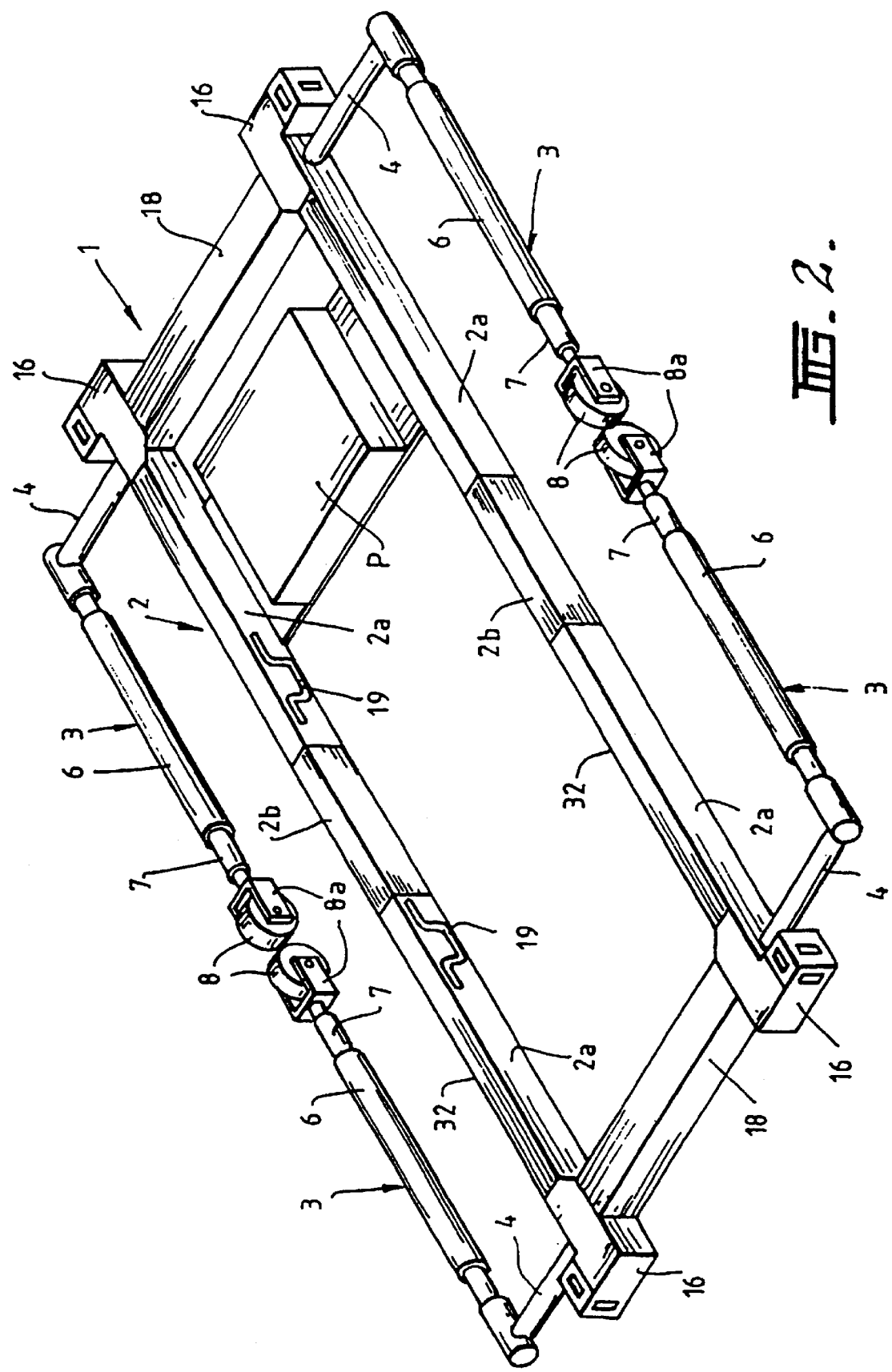
Figure 4A:
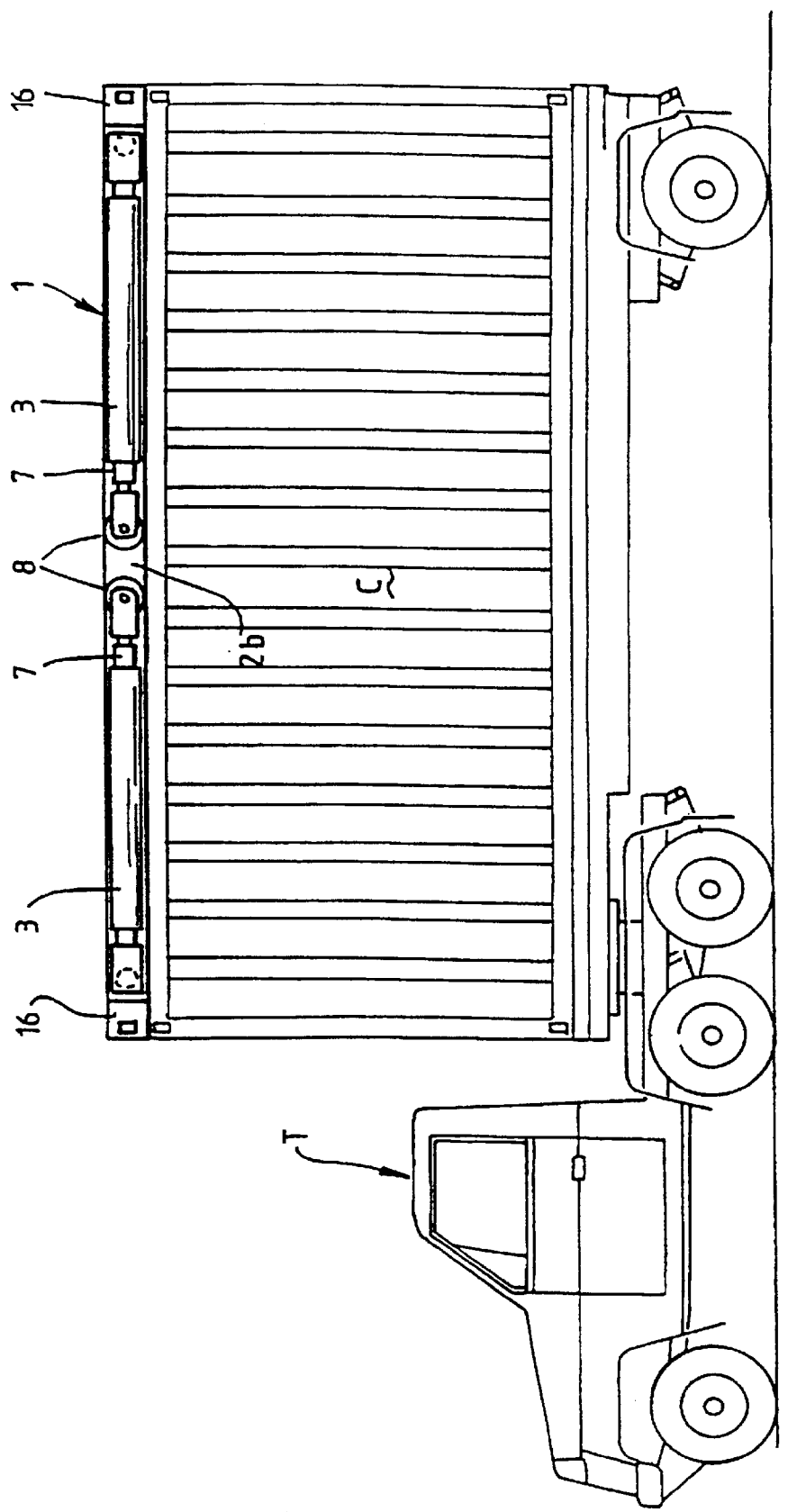
FIGS. 4a and 4b show a container with container cradle attached and positioned on the tray of a truck, FIG. 5. shows the container cradle during pivoting of the legs.
Figure 4B:
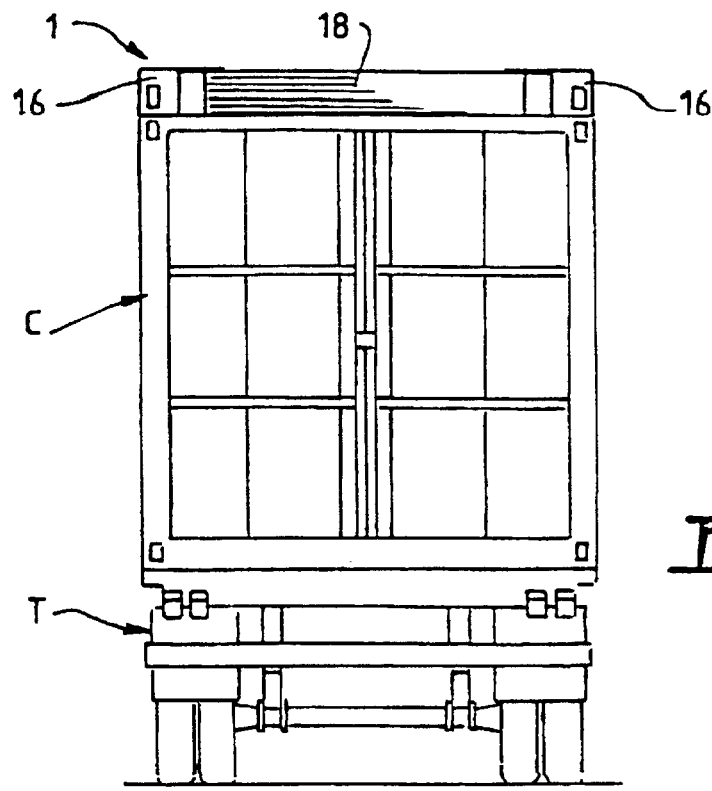

With reference to the drawings, the container handling apparatus of this preferred embodiment of invention consists of a cradle 1 having chassis 2 of rectangular configuration and dimensioned to correspond with the top of a container unit. With particular reference to FIGS. 1 and 2 of the drawings, the chassis 2 may be fabricated from two U-shaped chassis sections 2a the legs of which are adapted to be joined end to end to form the complete chassis with intervening fill-in members 2b which can be provided in a range of differing lengths to accommodate use of the cradle with containers of differing lengths. The chassis 2 has a box channel frame construction and incorporates container engaging means at each corner adapted to engage corresponding eyes on a container such that the container may be securely and stably engaged by the chassis 1 to form a substantially integral unit such that most manipulations of the container can be effected through the chassis.

Figure 9:
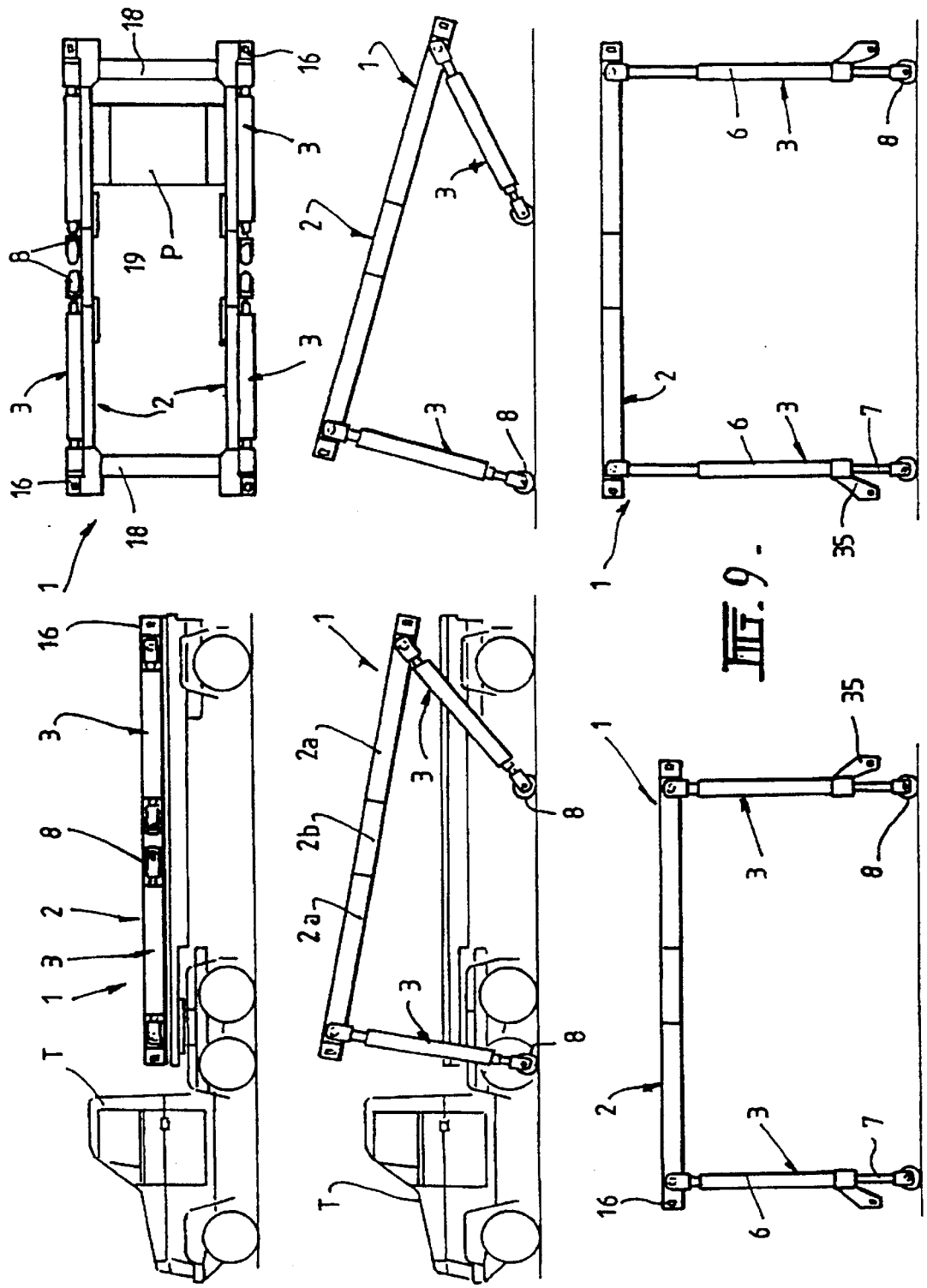
Figure 10:
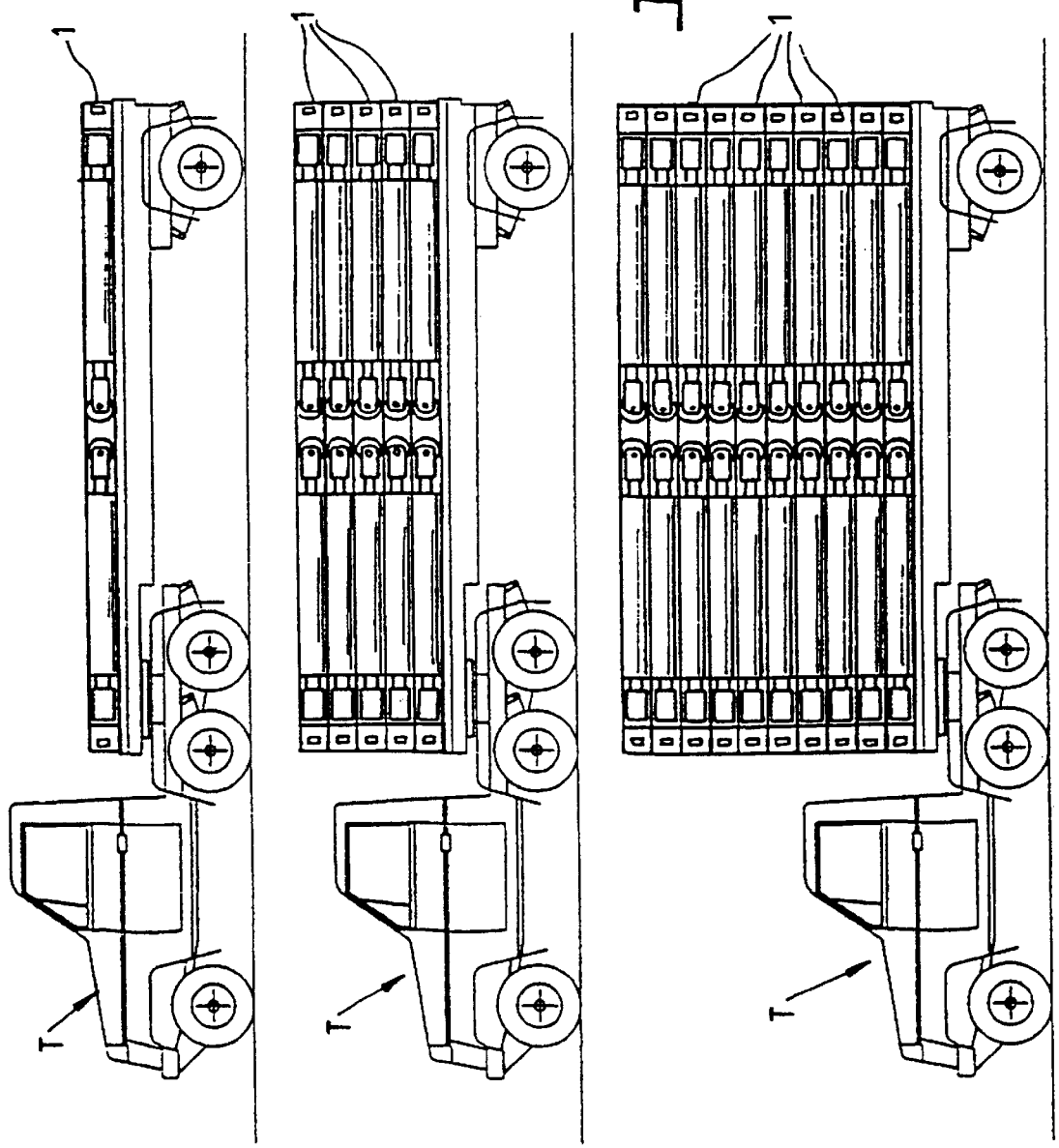

Lifting legs 3 are fitted to each corner of the chassis and are shown in a fully retracted state in FIGS. 1a, 1b, 3, 4a, 4b, some of FIG. 9, and all of FIG. 10, such that no part of the legs protrudes beyond the existing outside dimensions of the chassis which correspond to the outside dimensions of a container fitted to said chassis. In this manner the lifting legs are protected from transit damage.

The container engaging means are housed in corner block assemblies 16 which form the outermost corners of the chassis and between which, on either side of the chassis, elongate recesses 32 are defined and within which the lifting legs are stored when in the retracted state. The assemblies 16 are attached to the main channel components of the chassis. The two U-shaped chassis sections 2a of the chassis are constructed from two longitudinal steel channel sections 17 joined to two lateral end sections 18.

The inside of the chassis channel section 17 may be provided with fold up handles 19 to be engaged by forklift tines to provide a means of moving the cradle.

Referring to FIG. 2 of the drawings, the lifting legs 3 are shown in partially extended positions such that they now extend laterally in a direction planar to that of the chassis and protrude a sufficient distance to clear the dimensions of a container (and the tray of an associated truck). The lifting legs comprise a lateral extending member 4 telescopically fitted within the lateral end sections 18. The lateral extending member 4 has attached at its outer end a raising and lowering member 6 in the form of a hydraulic cylinder which incorporates a piston shaft 7 and carrying a wheel 8 via a yoke 8a. Each of the wheels 8 may be adapted to swivel about an axis co-axial with the length of the shaft 7, whereby to allow the cradle to be steered when being manoeuvred. In addition at least one of the pairs of wheels on opposite sides of the cradle may be power driven, or motorized, for example by hydraulic motors, to assist movement of the cradle apart from just manpower. Alternatively all four wheels may be driven. Means may also be provided to steer the wheels 8 via their yokes 8a, and with or without being power driven or motorised. Still further in addition the positions of wheels may be individually adjustable relative to the shafts 7, such as by axially adjustable screw fittings, whereby to accommodate undulations in the ground surface when the cradle or cradle and container combination is being manoeuvred around a site, and rather than have to individually adjust the lifting legs by the hydraulics later described.

Figure 6B:
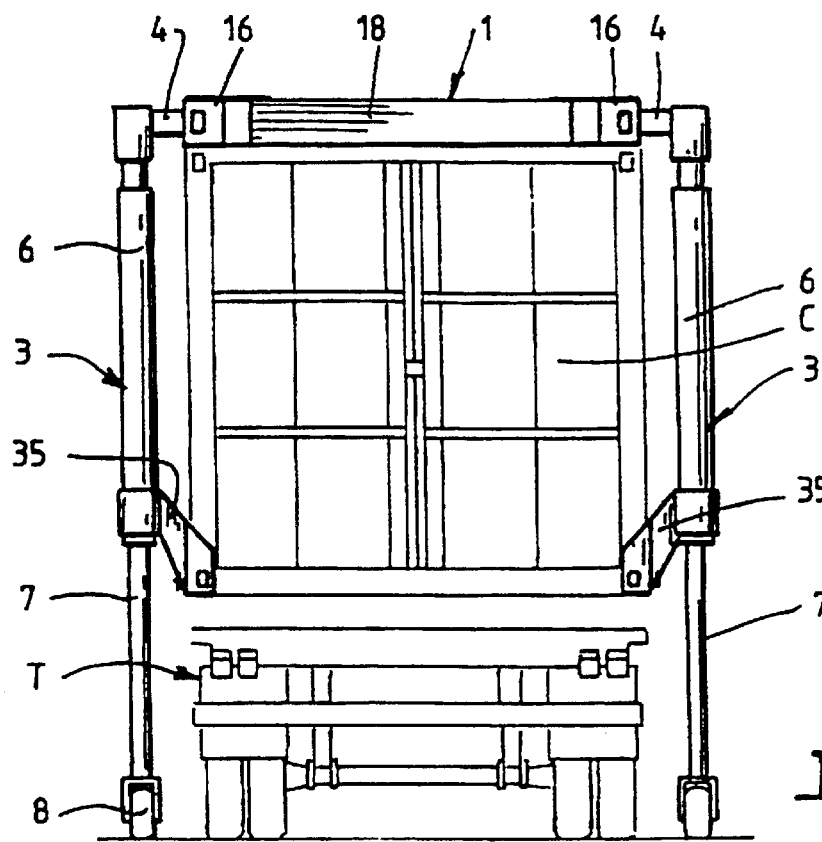
FIGS. 6a and 6b shows the container cradle supporting a container during loading onto, or unloading from, the tray of a truck, FIG. 7. shows the container cradle supporting a container but in independent transport mode, FIG. 8. shows the container on the ground and the container cradle free to move to next location, FIG. 9. is a series of side elevational views showing the container cradle unloading itself from the tray of a truck or raising itself off the ground, FIG. 10. is a series of side elevational views showing transportation of single cradle or a stack of cradles on the tray of a truck, FIG. 11. is a partially sectional view of the lateral adjustment mechanism of the legs in a closed, retracted, position, FIG. 12. is a partially sectional view of the lateral adjustment mechanism of FIG. 11 with the legs in an open, extended, position.
Figure 5:
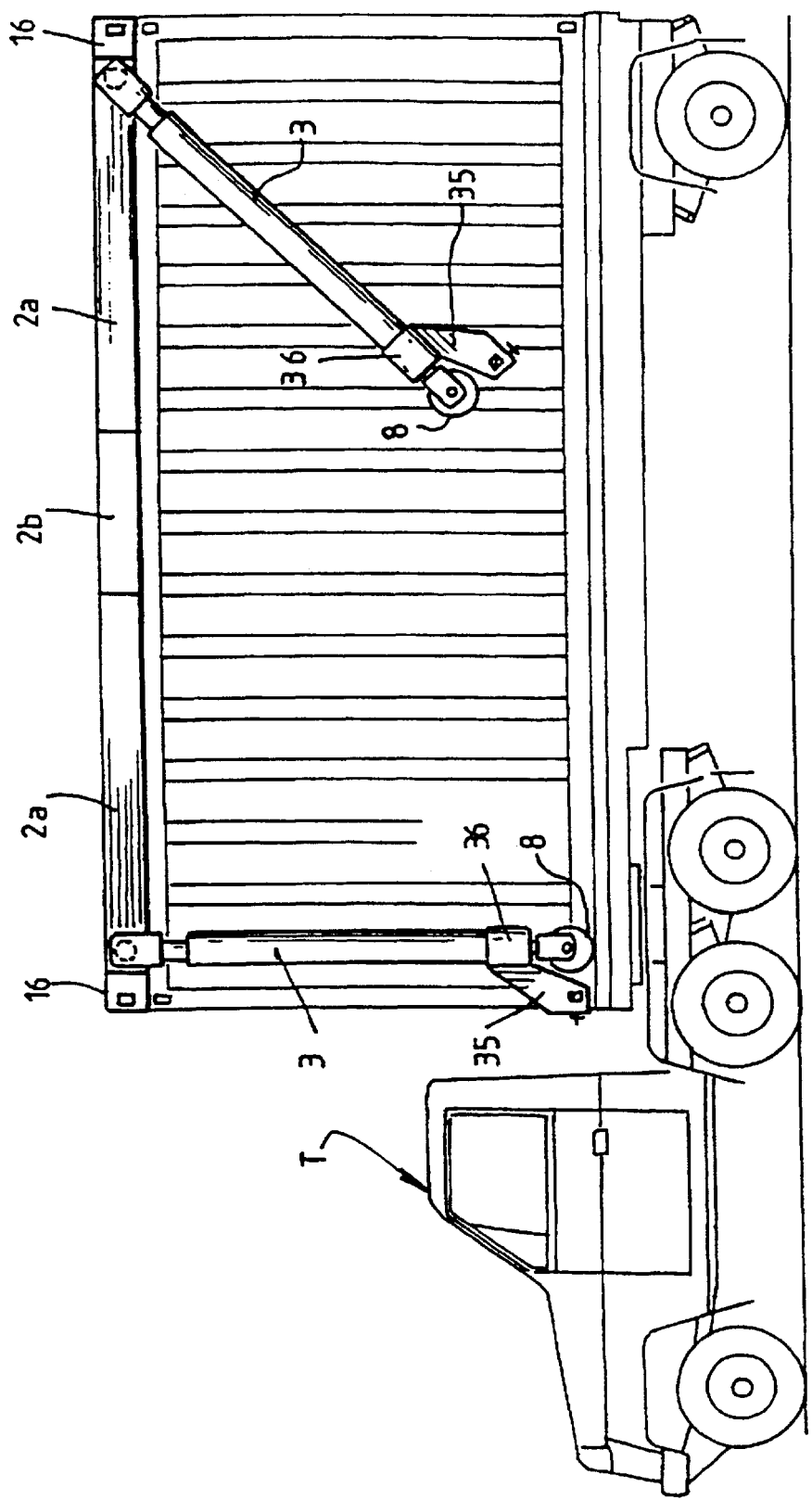
Figure 6A:
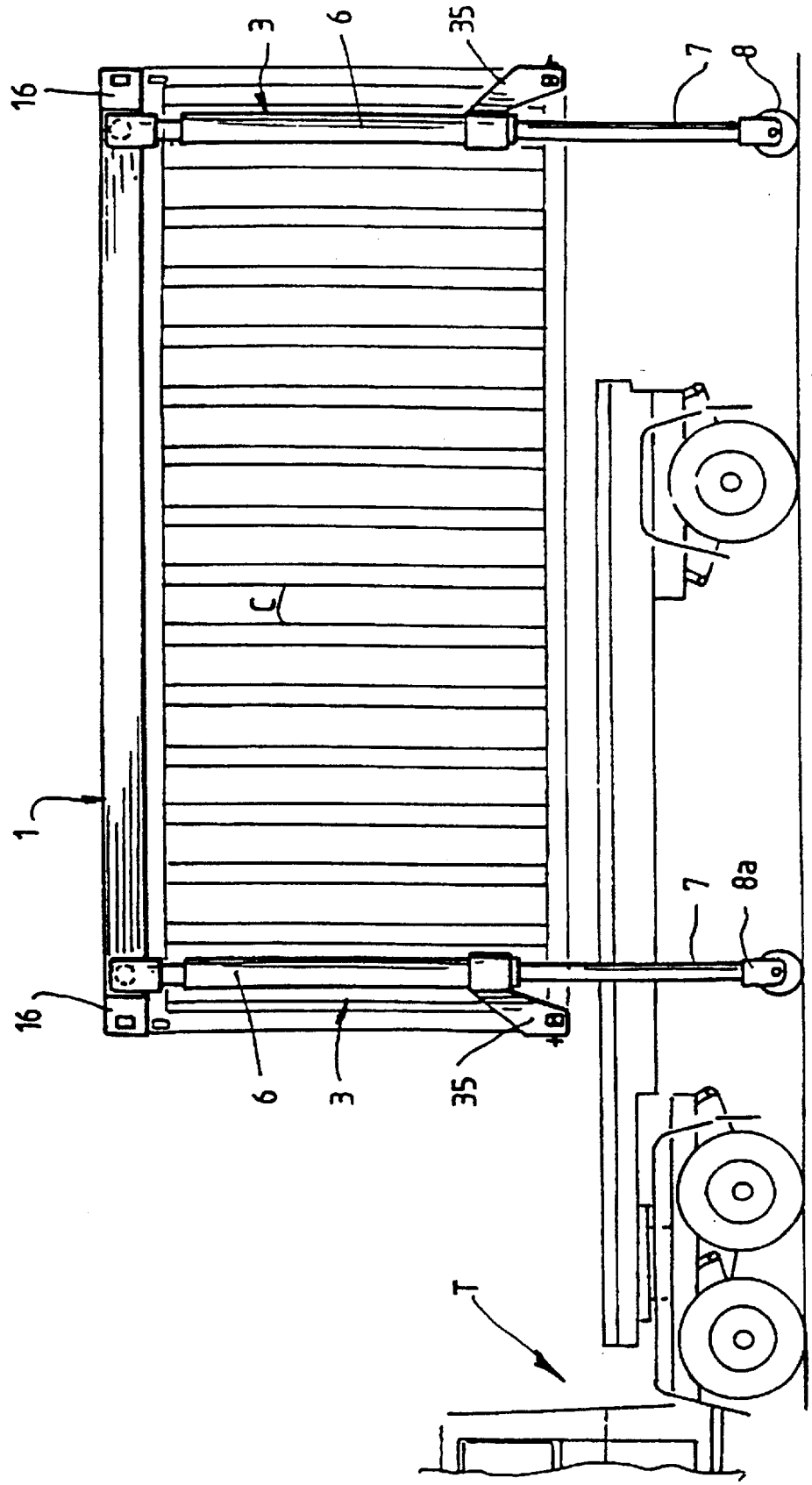

Referring now to FIG. 6, and via a sequence of movements shown in FIG. 5, the cradle is shown with the lifting legs in their rotated position with the piston shaft 7 extended to contact the wheel 8 with the ground. The raising and lowering member 6 is pivotally connected to the exposed end of the lateral extending member 4 by means of a stub axle 10 adapted to engage a brass bearing block 23 housed at the terminal end of the lateral extending member. The rotating capacity of the raising and lowering member 6 has been provided to allow the bulky raising and lowering member 6 to be stored in a horizontal orientation alongside the frame 1 when not in use but to be pivoted around into a substantially vertical orientation when required to provide lift for the container and cradle.

In operation, the raising and lowering member 6 is snugly housed in a horizontal orientation against the steel channel section 17 and protected by the projections of the corner block assemblies 16. Activation of the raising member 6 firstly extends the raising and lowering member laterally whilst still in a horizontal orientation until a point is reached where the side of a fitted container has been cleared. In the same continuous action, the continued extension of the raising and lowering member, by the telescopic extension of the lateral extending member 4, results in the rotation of the raising and lowering member 6 to a substantially upright or vertical positions as the lifting leg 3 reaches its full lateral extensions, which may also facilitate engagement with a locking device (35 to be later described) which locks the lifting leg 3 relative to the remainder of the structure for additional stability. Upon reaching the full lateral extension, the raising members are positioned directly above the ground in a vertical direction and ready to lift the cradle (and fitted container). The raising and lowering members are then activated by extending the hydraulic cylinder to project the shaft 7 and wheel 8 thereby contacting the ground and lifting the cradle and fitted container above the ground.

FIG. 4 shows a container cradle fully fitted with a container C as loaded on the tray of a truck T. The streamline dimensioning of the chassis 1 adopts the same plan dimensions of a container. The lifting legs 3 are fully tucked up into the chassis and are protected from damage by the outer corner block assemblies 16 and the bulk of the container.

Figure 11:
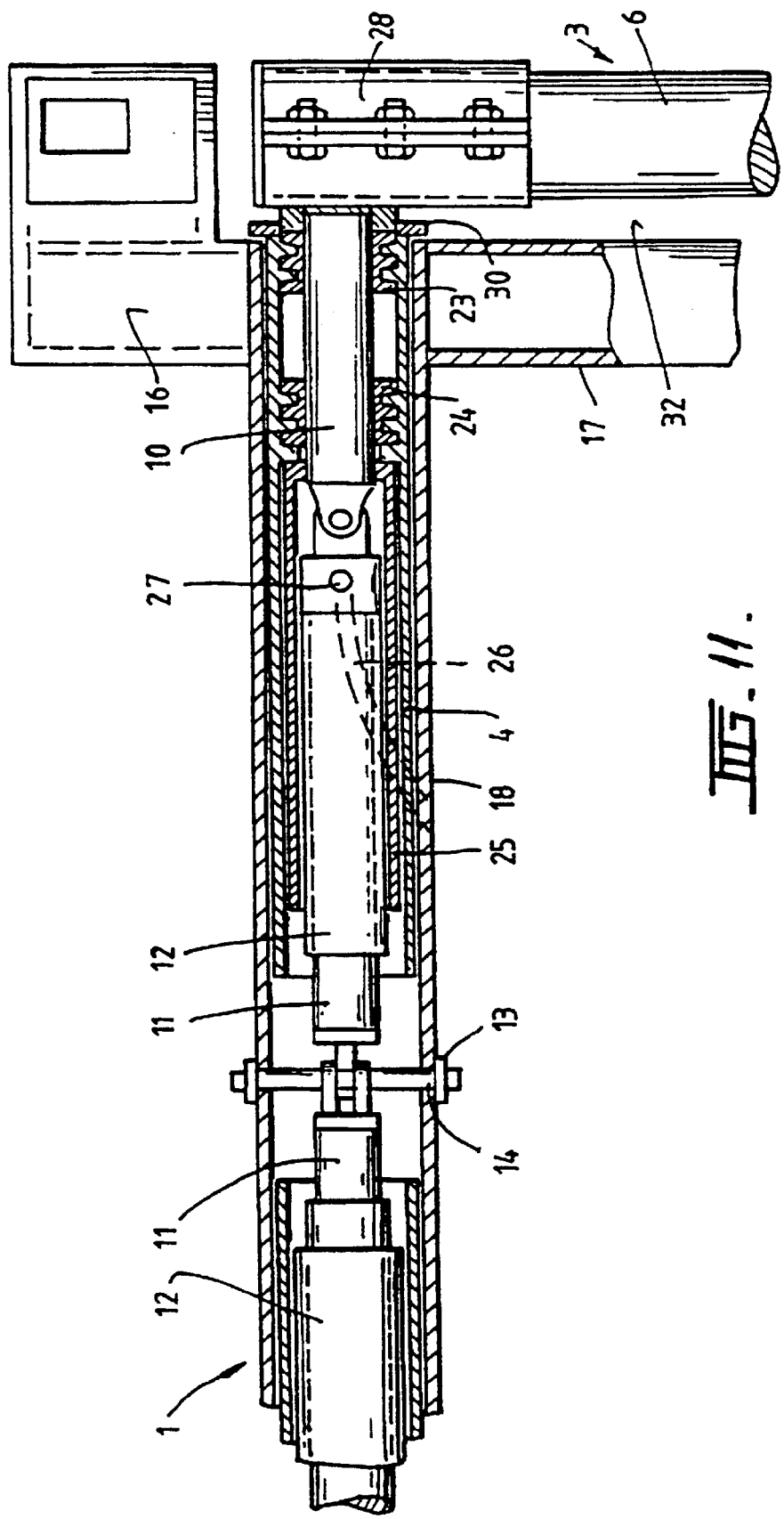
Figure 12:
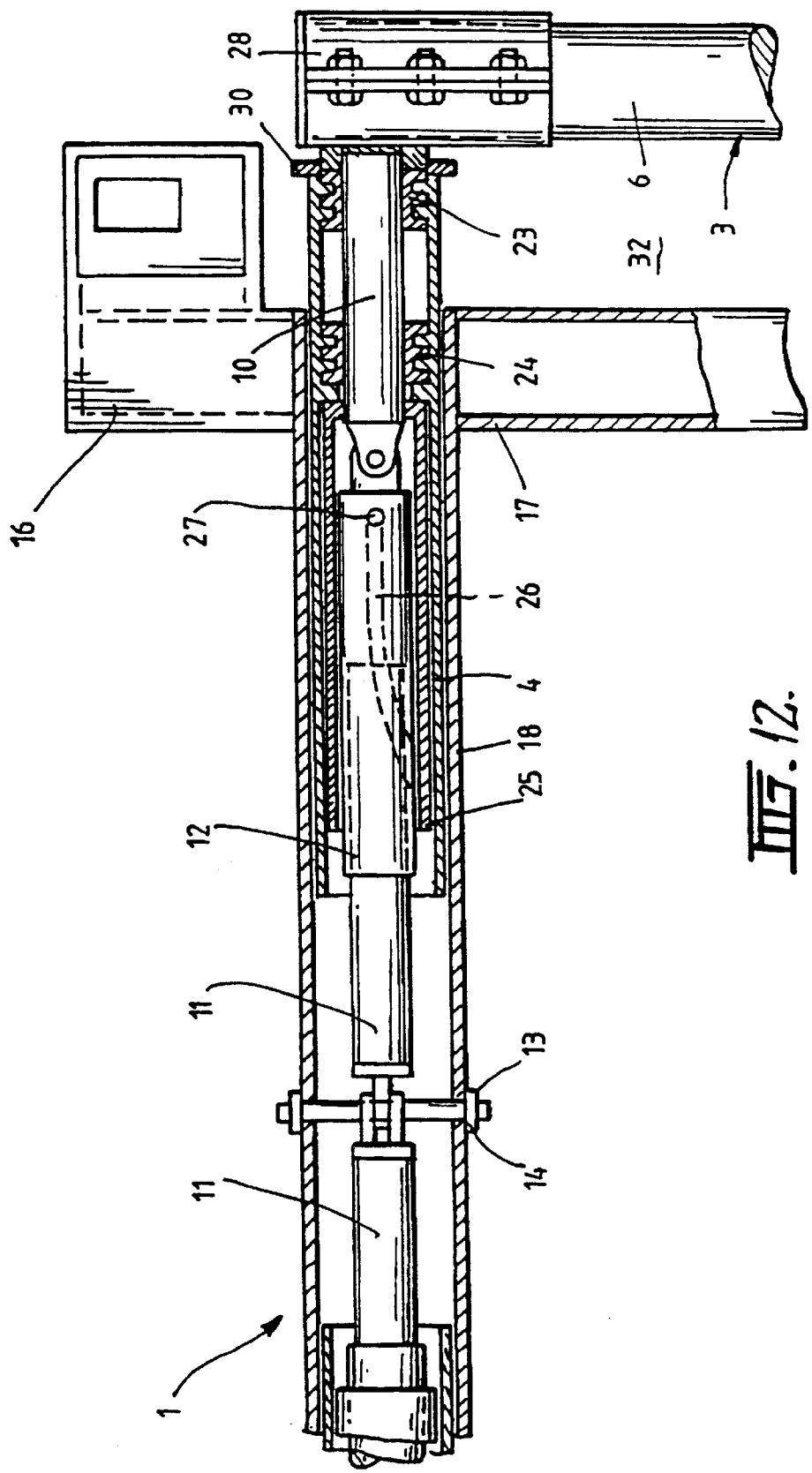

The mechanical operation of the lifting legs can be understood by reference to FIGS. 11 and 12. FIG. 11 shows a plan view in cross-section of one end of the chassis with one corner of the cradle shown. The end section 18 of the chassis is joined to the longitudinal section 17. The-inside of the section 18 of the chassis is machined to close tolerances to accept the lateral extending member 4 in snug telescopic engagement. The lateral extending member 4 is a channel section steel unit of a little less than half the length of the section 18 and is machined to close tolerance so as to provide a smooth and snug telescopic fit to the inside of the section 18. The tolerances of the snug fit are not critical but it is preferred that the vertical tolerance be very close so as to allow only a minimal movement of the telescopically engaged lateral extending member 4 in a vertical orientation whilst the horizontal tolerance may provide a degree of horizontal movement to allow for the horizontal adjustment of cradle where one end of the cradle may be moved at a time without causing any binding of the lateral extending members. The outer end of the sections 18 are fitted with the outer bronze bearing 23 at the end of the tube and an inner bronze bearing 24. The twin bronze bearings accommodate the stub axle 10. The stub axle is held in axial alignment by an outer collar 30 fitted to the external end of the stub axle and a rotation tube 25 fitted to the internal end of the stub axle. The rotation tube is cylindrical in section and dimensioned to fit over the stub axle and abut the inner bronze bearing 24 at one end, and of a suitable outside diameter to fit within the lateral extending member 4 so as to allow rotation within the lateral extending member. The external end of the stub axle is fitted with a clamping ring 28 which is adapted to receive the raising and lowering member 6. In this manner, the raising and lowering member 6 of the lifting leg 3 can be rotated co-axially about the lateral extension member but is held in axial alignment with the lateral extension member such that the stub axle and lateral extending member can only move in unison in a lateral direction but the stub axle is free to rotate relative to the lateral extending member. The rotation of the stub axle is controlled and co-ordinated with the lateral movement of the lateral extending member by the action of one hydraulic rotation and extension cylinder 11. The rotation and extension cylinder body is attached within the section 18 to a pin 13. The pin 13 passes through the section 18 at 14 and is positioned substantially midway in the center of the section 18. The rotation and extension cylinders for both left and right mechanisms are attached to the one common pin 13. The rotation and extension cylinder 11 is dimensioned to fit within the rotation tube 25 and has its shaft 12 attached to the inner end of the stub axle 10. The co-ordinated rotation of the stub axle is effected by a curved slot 26 which is formed in the rotation tube which surrounds the rotation and extension cylinder. The body of the rotation and extension cylinder is provided with a rotation pin and bearing 27 which is adapted to engage the curved slot 26. The body of the rotation and extension cylinder is prevented from rotation by its attachment to the assembly pin 13 and similarly the rotation pin and bearing are also prevented from rotating. The stub axle and rotation tube 25 are, however, free to rotate and as the rotation and extension cylinder causes the stub axle and lateral extension member to move out from the chassis, the spiral section of the rotation cylinder causes the stub axle to rotate. The mode of operation and co-ordination of the lateral and rotational movement of the raising member can be appreciated with reference to FIG. 12. FIG. 12 details the lateral extension member 4 at partial extension where the lateral extension member 4 and stub axle 10 have been moved laterally by the extension of the rotation and extension cylinder 11 and the shaft 12. The rotation pin and bearing 27 have therefor moved relative to the axial section of the spiral slot 26 to the point where the spiral section of the slot begins. At this point, the raising and lowering member 6 has nearly reached the point where it has cleared the external dimensions of the pallet container as seen by reference to the corner block assembly 16.

The continued action of the rotation and extension cylinder 11 and shaft 12 extend the lateral extending member 4 and stub axle 10 to their full extension. The influence of the spiral section of the spiral slot acting on the fixed rotation pin and bearing 27 having caused the rotation tube 25 and stub axle 10 to rotate. The rotation of the axle 10 in turn has caused the raising member 3 to be rotated into a substantially vertical orientation. The verticality of the raising cylinder is only effected in a co-ordinated action which ensures that the lateral extension member has moved out from the chassis a sufficient amount to allow the raising and lowering members to fully clear the container and cradle.

The chassis which is provided with lifting legs 3 at each corner and the coordinated action of the four legs acts to provide the means of lifting the cradle 1 and container C from the ground or from the tray of the truck T.

Once the cradle is supported by the four lifting legs, the vertical position of the cradle can be controlled by the action of the raising members 3. The pin 13 passes through the load transfer tube and anchors the rotation and extension cylinder 11 such that all lateral movement of the lifting legs is effected relative to the pin.

Figures 13A, 13B:
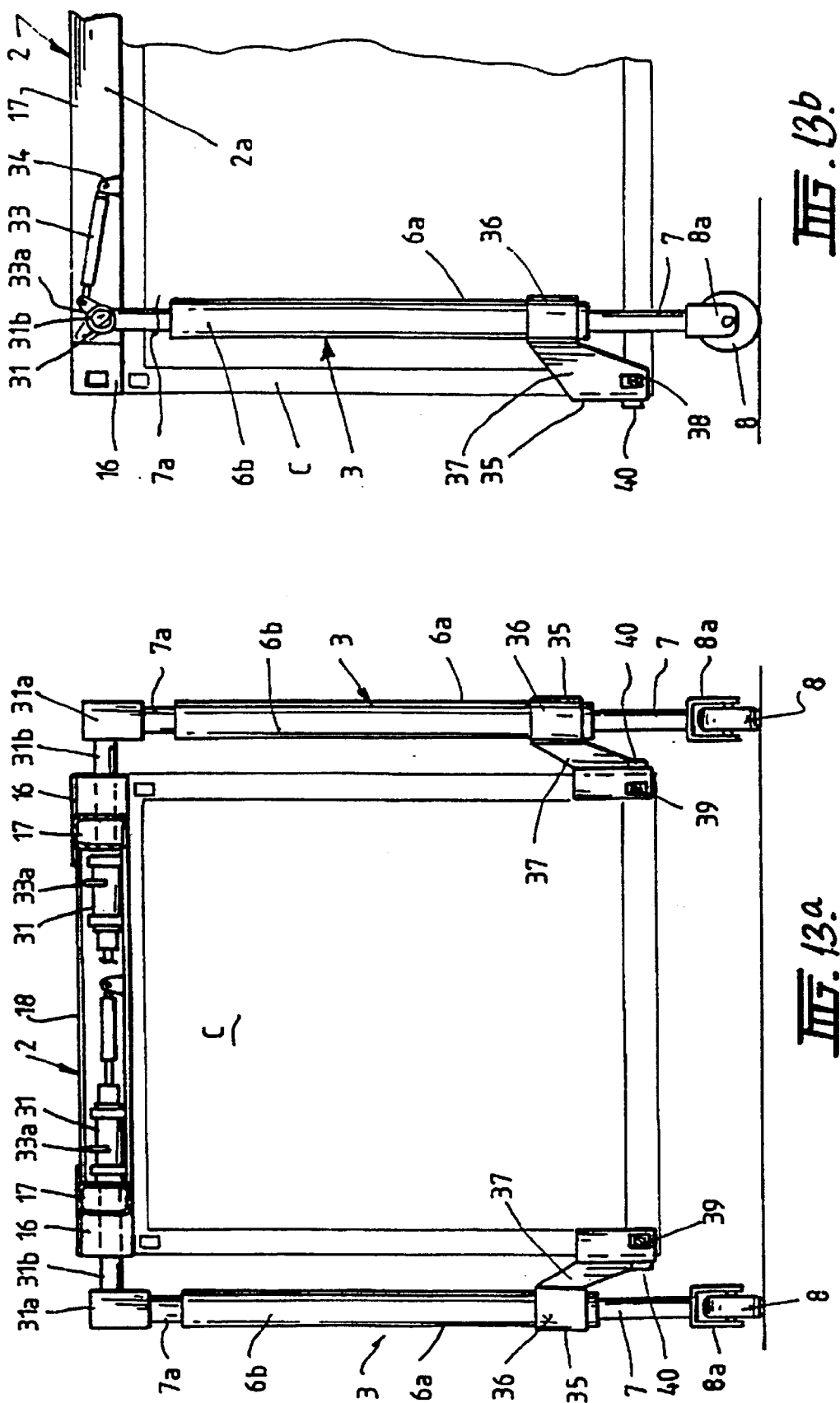
FIGS. 13a and 13b are an end elevational and a partial side elevational view of a lateral and rotational adjustment mechanism for the legs as an alternative to that of FIGS. 11 and 12.

With reference to FIGS. 13*a* and 13*b* of the drawings, and as an alternative to the rotational and lateral adjustment mechanism of FIGS. 11 and 12, the cradle may house, adjacent each lifting leg, a hydraulic ram 31 which is attached to connecting members 31*a* of the top ends of the lifting legs, and extendable to shift the top ends of the lifting legs 3 laterally outwardly from the chassis 2 of the cradle, as shown in 13*a*, and retractable to draw the top ends of the lifting legs laterally inwardly and back against the sides of the chassis of the cradle. In this embodiment, the lifting legs are swung, from the stored horizontal position within the elongate recesses 32 of the chassis, to the vertical raising and lowering position, by hydraulic rams 33 coupled to pivoting lugs 33*a*, whilst the lugs in turn are attached to, and extend radially outwardly from the rams 31, whereby to rotate the rams about their longitudinally axis 31*b* and as a consequence the lifting legs can be swung by extension or retraction of the rams 33 between the vertical lifting position and the horizontal stored position.

The hydraulic rams 33 are pivotably anchored to the cradle chassis by anchoring lugs 34.

The hydraulics supply systems for the rams 31 and 33 may be linked, whereby the rotational and lateral adjustment of the positions of the lifting legs occur simultaneously. Alternatively, the hydraulics supply systems may operate independently of each other, that is, the lifting legs are firstly shifted by the rams 31 laterally away from the chassis and out of the recesses 32, whereafter the rams 33 are actuated to swing the lifting legs downwardly to their vertical positions, whilst the opposite sequence of events is followed to return them to their horizontal stored positions within the recesses 32.

In accordance with the invention the cradle is fitted to the topside of the container C. In this manner, a single container cradle can be fitted to multiple containers in sequence such that only one container cradle is needed to facilitate the handling of a plurality of separate containers.

In order to accommodate different container heights, the lifting legs 3 may incorporate two rams 6*a* and 6*b*, one (6*a*) actuable to raise and lower the cradle by extending and retracting the piston shaft 7, whilst the other (6*b*), via a piston shaft 7*a*, can be actuated to extend the overall lengths of the shifting legs to accommodate containers of increased heights notwithstanding the stroke of the lifting rams.

In order to fully stabilise a shipping container suspended from the cradle, in addition to the container engaging means in the corner block assembly 16, and which engage the top corners of the shipping container, the lifting legs carry locking devices 35 (omitted from some drawings for the sake of clarity) axially rotatable about the lifting legs and each composed of a sleeve 36 surround the lifting leg; a radially outwardly and downwardly extending bracket 37 carrying at its outer end a pair of container engaging members 38 and 39 to engage the lower corners of the container via the recesses normally provided in the lower corners of a shipping container at both the ends and sides thereof. The container engaging members 38 and 39 have enlarged heads dimensioned so that they can enter the relevant recess, but when twisted through 90° they then engage within the relevant recess. The container engaging members 38 at the sides of the container will automatically enter their relevant recesses when the locking devices is swung into position, and thereafter only require them to be twisted through 90°, whilst the container engaging members 39 need to be firstly pushed into their relevant recesses and thereafter twisted through 90°. The brackets 37 carries screw like adjusters 40 between the respective container engaging members 38 and 39, and which when screwed inwardly bear against the corner of the container and thereafter draw the container engaging members 38 and 39 into tight engagement with their respective recesses.

CRADLE ELECTRICS

Power supply to the cradle may be either internal PC or from external sources at 240 or 415 volt.

Three phase electrical power is directly used or split into single phases and fed to separate 240 V motors which supply power to separate hydraulic pumps for activation of the hydraulic cylinders.

CRADLE HYDRAULICS

The raising and lowering members comprised by the hydraulic cylinders 6 are of 100 to 150 mm internal diameter, stroke 1800 mm and shaft diameter of 75 to 100 mm operated with a pressure of 3000 psi.

The lateral adjustment cylinders 9 are provided as hydraulic cylinders of 100 mm internal diameter with 300 mm stroke and a shaft of 40 mm diameter and operated with a pressure of 3000 psi.

The rotation and extension cylinders 11 are provided by hydraulic cylinders of 40 to 75 mm internal diameter with a 750 mm stroke and a shaft of 25 mm diameter and operated with a pressure of 3000 psi.

The hydraulic power may be provided internally by way of single or multiple electrical pumps to generate the hydraulic pressure (see powerpack P in FIG. 2), or by external supply of hydraulic pressure.

All of the above details of the cradle hydraulics can be varied to suit different container weights from very heavy to very light load applications.

A particularly preferred mode of operation of this embodiment of the invention will now be described with reference to the drawings and detailed description.

In use, the container cradle provides an accessory for semi permanent attachment to a container to provide a container with an in situ, self contained hydraulically activated lifting system for on-loading, off-loading and short distance movement.

The four lifting legs 3 extend laterally from the frame, the four hydraulic rams 6 that act as raising members are attached to the legs, rotate to vertical if required; then extend to the ground to lift the cradle and the attached container free of the truck T or train. Once clear of the truck, the legs can lower the cradle to the ground or to any other desired height.

When loading onto a truck as the mode of transport, the cradle is lifted above truck height and the truck backs under the cradle or the cradle rolled over the tray of the truck.

Once retracted all hydraulic components are contained within the physical dimensions of the cradle.

The cradle can be self loaded onto transport or by the fold up forklift tine handles provided. These handles are for loading the cradle only.

ONE EXAMPLE OF SYSTEM OPERATION

1. Unloading of Container and Cradle

Truck arrives with a container on board already fitted with a container cradle of the invention or subsequently fitted upon arrival (FIG. 4).

The operator positions the container, unlocks load and connects power (either electrical, petrol or diesel motors) to the container cradle. While power is supplied to the cradle the on board hydraulic system can provide 3000 pounds per square inch pressure to supply all facilities on demand.

The selected lifting legs extend laterally outward from the side of the cradle until the raising and lowering members are clear of the container where lateral and rotational movement occur simultaneously (FIG. 5), this movement continues until the raising and lowering member cylinders are vertical and the lateral extending members are fully extended. At the end of the lateral travel a hydraulic sequencing valve operates directing fluid to the raising and lowering member cylinders extending the shafts until just before the wheels touch the ground the wheels touch the ground the locking devices are then engaged and the weight of the cradle and container combination is taken via the cradle, and further operation of the raising and lowering members lift the container and cradle from the tray of the truck whereafter the truck moves away from under the container or the cradle is moved away from over the tray of the truck (FIG. 6).

2. Loading of Container and Cradle

Truck arrives to receive the cradle and the container or the container only.

The operator backs truck up underneath cradle and container, using the sides of the container for sighting, or the cradle with container is rolled over the tray of the truck.

The bottom corner blocks of the containers are aligned with the truck locking pins by turning the wheels 8 through 9°, that is directed laterally of the cradle and whereby to allow lateral movement of the cradle.

The raising and lowering member cylinders lower the cradle and container onto the trucks locking pins. When the load is taken by the truck the locking devices are then disengaged the shafts continue to retract until all four shafts are fully retracted.

The raising and lowering member cylinders rotate from vertical to horizontal and retract the lifting legs into the cradle.

The drawings of FIG. 9 show the cradle in various modes of orientation when being loaded or unloaded by itself onto and off the tray of a truck, whilst the drawings of FIG. 10 show single or stacked arrangements of cradles on the tray of a truck.

Of particular importance, are the locking devices 35 extending from the lifting legs and which engage with the normal corner blocks of a container, whereby, when the container and cradle combination is in the raised position, the combination as a whole is stable and can be securely and safely moved around a site (see also FIG. 7).

Figure 8:
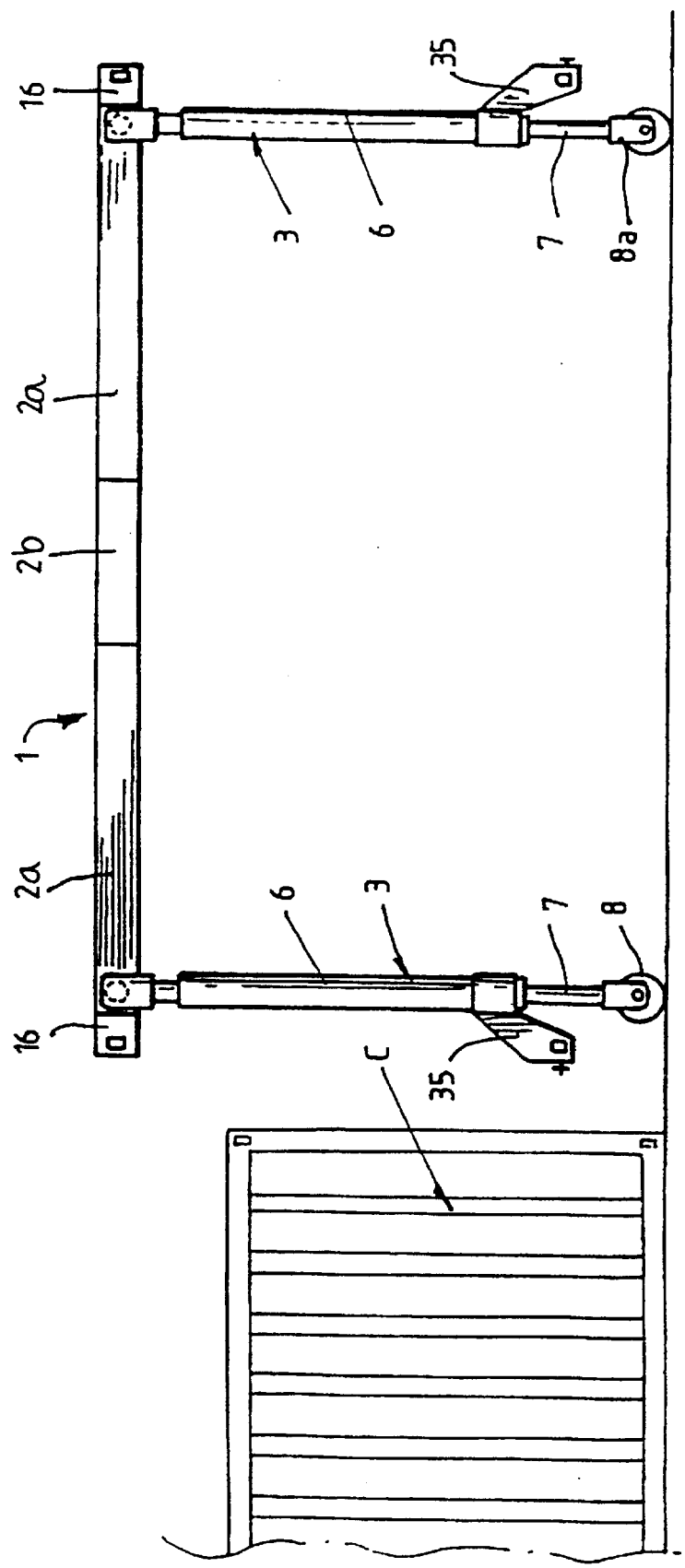

One other additional advantage of the cradle of the preferred embodiments of the invention over and above the top mounted cradle (pallet) of the embodiment of FIG. 8 disclosed in prior art patent publication no. WO94/26630 referred to previously is, unlike the prior art, far less complicated whilst no part or parts of the cradle at any time obstruct access to doors at either or both ends of a container which would prevent the loading contents into, or unloading contents from, the container. This is of particular importance when the cradle is used to adjust the height of the container to coincide with varying heights of loading platforms at, for example, factory sites.

What is claimed is:

1. A shipping container handling apparatus including a cradle having a chassis adapted specifically for attachment to the top of a shipping container and having lifting legs attached to each corner of the chassis and incorporating lifting rams, wherein the legs are pivotably attached at pivot points to the respective corners whereby to be swung between positions extending alongside said chassis in a stored orientation and positions extending downwardly from said chassis in a ground engaging orientation, and wherein the pivotable attachments from said lifting legs are such that the positions of the legs can be extended and retracted laterally of said chassis, and wherein the lower ends of said legs carry wheels for mobility whereby said cradle with said legs extending downwardly from the chassis in a ground engaging orientation with, or without, a shipping container suspended beneath said chassis, can be moved from one position to another, and wherein the corners of said chassis have means for attachment thereof to the top corners of said shipping container and the chassis has recesses extending longitudinally thereof between the means for attaching said chassis, and on each side thereof, for accommodating said legs when in the stored orientation.

2. A shipping container handling apparatus as claimed in claim 1, wherein the pivot point attachments of said lifting legs to said chassis are such that the lateral movement of said legs, and their pivotable movement, relative to said chassis is accomplished simultaneously.

3. A shipping container handling apparatus as claimed in claim 1, wherein the pivotable attachment of said lifting legs to said chassis is such that the lateral movement of said legs, and their pivotable movement, relative to said chassis are accomplished independently of each other.

4. A shipping container handling apparatus as claimed in claim 1, wherein the lifting legs incorporate additional rams for adjusting the overall height of said legs to accommodate shipping containers of different heights and notwithstanding the strokes of said lifting rams.

5. A shipping container handling apparatus as claimed in claim 1, wherein said lifting legs carry locking devices to engage the lower corners of said shipping container to further stabilize said container when supported by said cradle and in addition to the connections of the top corners of said containers.

6. A shipping container handling apparatus as claimed in claim 1, wherein said wheels are power driven.

7. A shipping container handling apparatus as claimed in claim 1, wherein the cradle has means to adjust its length to accommodate containers of different lengths.

8. A shipping container handling apparatus as claimed in claim 1, wherein said wheels are longitudinally adjustable relative to their respective lifting rams to accommodate undulations in the ground surface when the cradle or cradle and container combination is being maneuvered.

9. A shipping container handling apparatus as claimed in claim 1, wherein said wheels are steerable.

10. A shipping container handling apparatus as claimed in claim 1, wherein said wheels are power driven and steerable.

* * * * *